(12) United States Patent
Kato et al.

(10) Patent No.: US 6,924,474 B2
(45) Date of Patent: Aug. 2, 2005

(54) LIGHT LEAKAGE DETECTING DEVICE OF AN OPTICAL TRANSMISSION SYSTEM USING FIBER OPTIC CABLE

(75) Inventors: Yoshinori Kato, Kanagawa (JP); Takaaki Kosuge, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 325 days.

(21) Appl. No.: 10/244,546

(22) Filed: Sep. 17, 2002

(65) Prior Publication Data

US 2003/0053738 A1 Mar. 20, 2003

(30) Foreign Application Priority Data

Sep. 18, 2001 (JP) ........................................ 2001-283849

(51) Int. Cl.⁷ .................................................. G01J 1/04
(52) U.S. Cl. .............................. 250/227.11; 250/227.15
(58) Field of Search ....................... 250/227.11, 227.14, 250/227.15, 227.24; 340/555, 556, 557

(56) References Cited

U.S. PATENT DOCUMENTS 4,812,641 A * 3/1989 Ortiz Jr. ...................... 250/205
5,104,391 A * 4/1992 Ingle et al. .................... 606/11

* cited by examiner

*Primary Examiner*—Que T. Le
(74) *Attorney, Agent, or Firm*—Sughrue Mion, PLLC

(57) ABSTRACT

A technique is provided in which the inside and outside of an exposure device is prevented from being adversely affected by leakage of light by setting an inspection output most suitable for high-power LD. A light-leakage detection level is set correspondingly to output characteristics of each high-power LD, and respective thresholds thereof are previously stored. As a result, leakage of light can be determined in a lower-power state of 100 mW or less. Accordingly, even if leakage of light may occur, leakage of light can be determined before high-power light leaks, and the inside and outside of the device can be prevented from being adversely affected by light leakage.

10 Claims, 8 Drawing Sheets

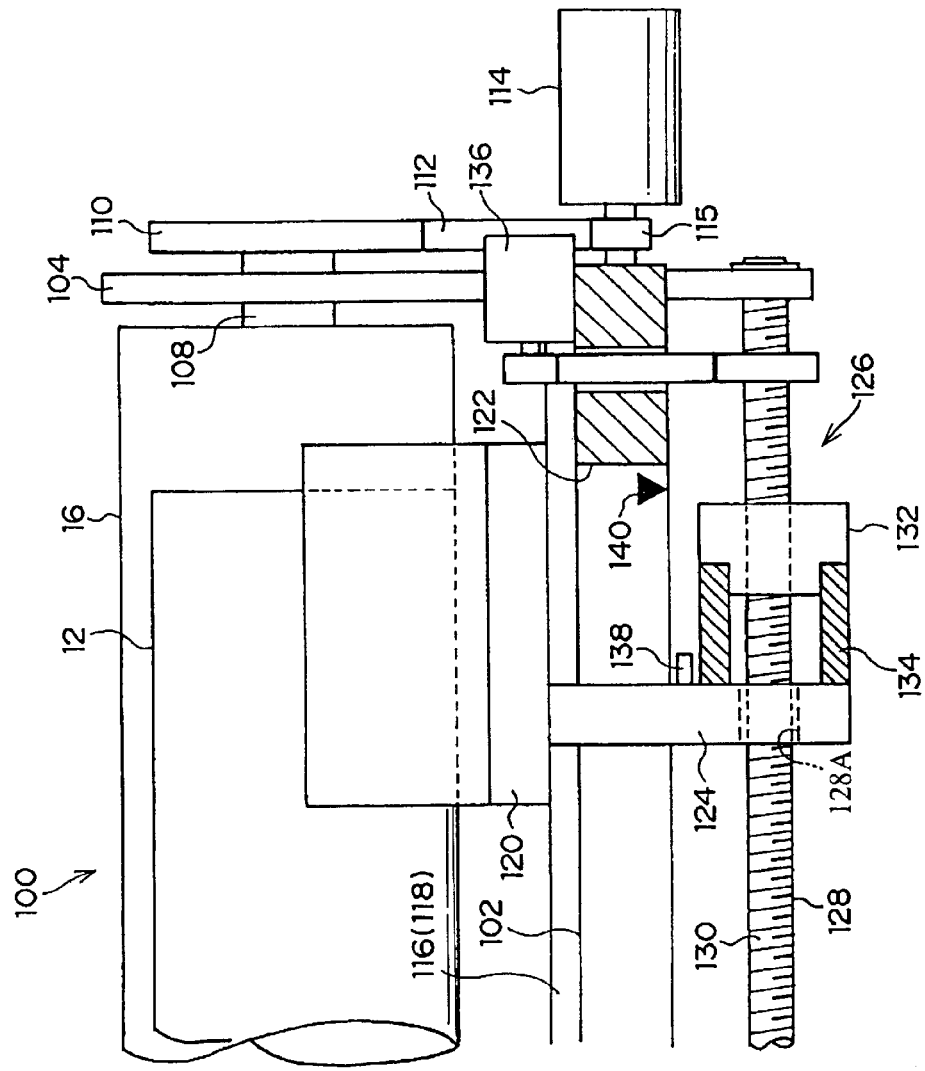

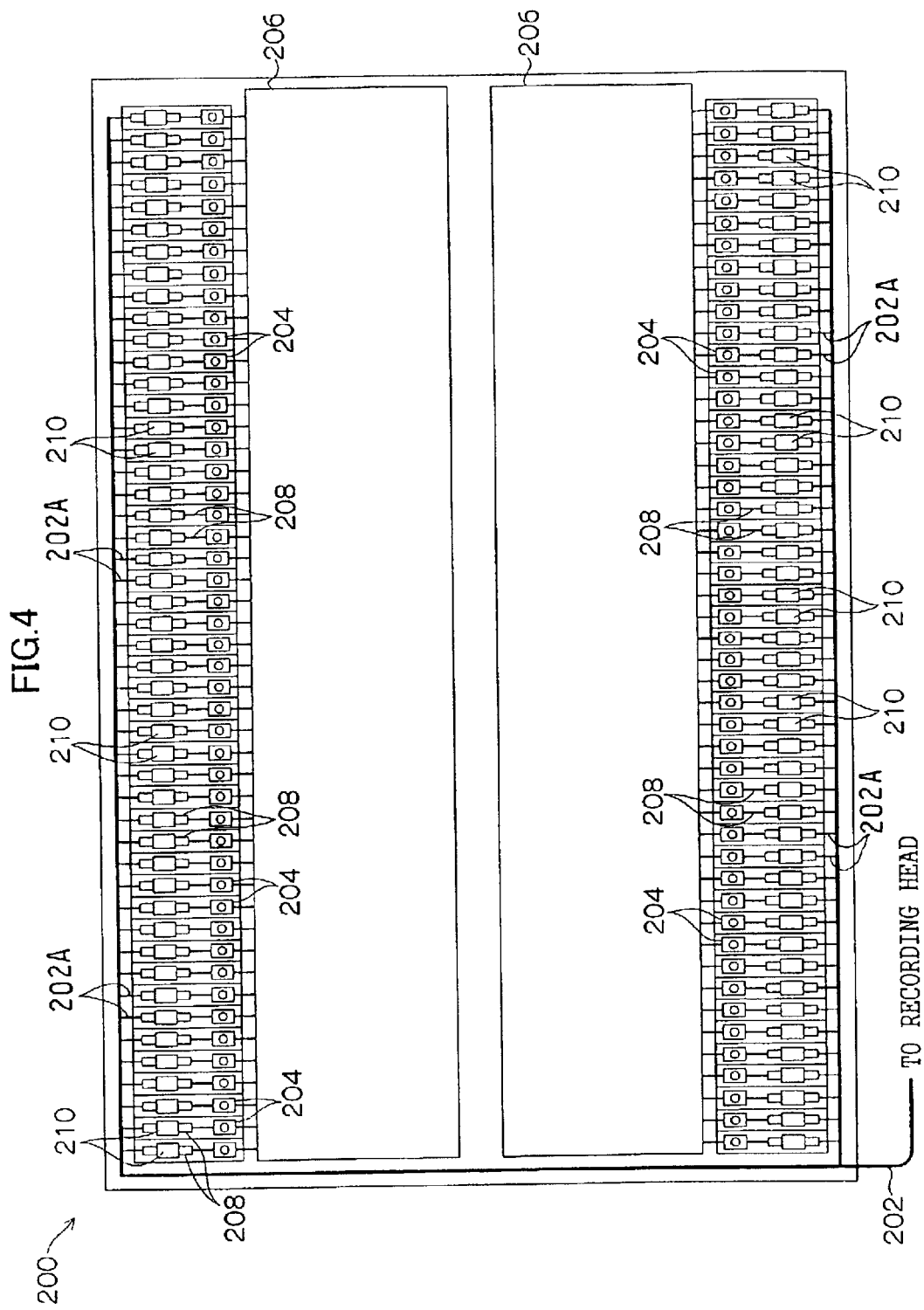

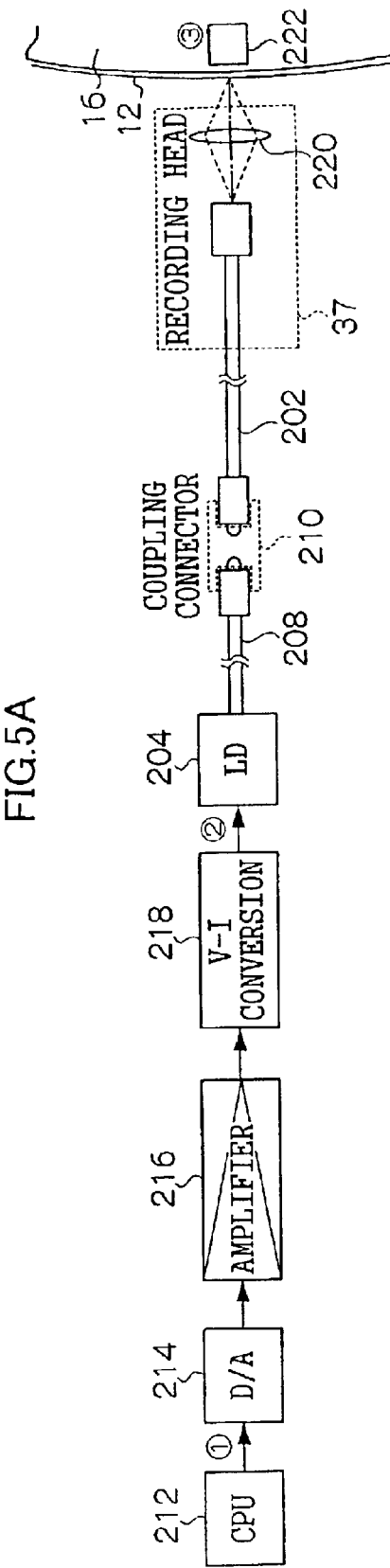
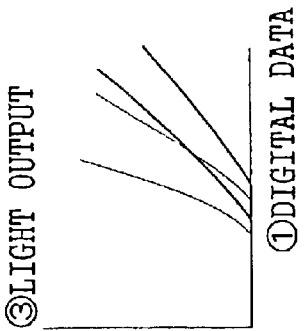
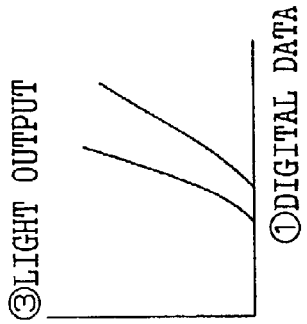
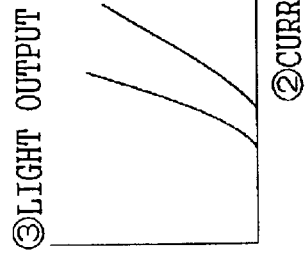
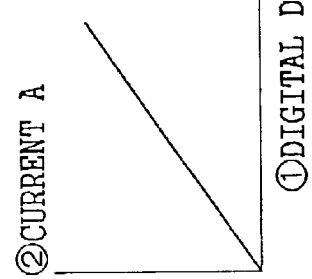

LIGHT LEAKAGE DETECTING DEVICE OF AN OPTICAL TRANSMISSION SYSTEM USING FIBER OPTIC CABLE

BACKGROUND OF THE INVENTION

1. Field of the Invention

The present invention relates to a light leakage detecting device of an optical transmission system using a fiber optic cable, which device is used in an optical transmission system in which high-power light is outputted from a light guiding end of a fiber optic cable, and is used to detect light leakage in the optical transmission system.

2. Description of the Related Art

A technique has been developed in which a sheet-like recording material, particularly, a printing plate having a photosensitive layer formed on a support is used, and an image is recorded directly on the photosensitive layer (an emulsion surface) of the printing plate by means of a laser beam or the like (a printing plate exposure device). This kind of technique allows rapid recording of an image on a printing plate.

In an automatic printing plate exposure device using a technique for recording an image on a printing plate, an image is recorded on a printing plate in such a manner that, with the printing plate being wound on a peripheral surface of a rotating drum, a recording head (an exposure head) is moved along an axial direction of the rotating drum (sub-scanning) while the rotating drum is being rotated at a high speed (main scanning).

A photosensitive material such as the aforementioned printing plate has a density corresponding to an amount of exposure. Therefore, in order that the photosensitive material may have a density in a predetermined density range, one of increase or decrease in the quantity of light, or increase or decrease in exposure time is selected. In a scan-recording system in which a recording head is moved while a rotating drum is being rotated, the exposure time is limited because of high speed processing. Therefore, a high-power LD is used as a light source because it can emit a large quantity of light to accomplish the aforementioned purpose.

Further, in the automatic printing plate exposure device, a plurality of (for example, 50 or thereabouts) light sources are arranged in a sub-scanning direction so as to allow higher speed processing. As a result, sub-scanning by a plurality of light sources becomes possible by one revolution of the rotating drum.

However, in a case in which a plurality of light sources are used, all of the light sources cannot be mounted on a recording head which moves in a sub-scanning direction (because of increase in weight, or the like). Therefore, a light source unit is provided separately from the recording head and light from the light source unit is guided to the recording head via a connector and an optical fiber.

In this case, it is necessary to sufficiently give attention to leakage of light from a high-power LD. Therefore, an output state of the LD is monitored at predetermined intervals. That is, a light-quantity detecting sensor is disposed at an end surface of a rotating drum, and when a recording head is located at a home position, the LD is made to output light for inspection and the outputted light is compared with a predetermined threshold. As a result, it is determined as to whether leakage of light occurs or not.

However, in a conventional method, a high-power LD is made to output light in an approximately full-power state and the outputted value is compared with a threshold. Consequently, when an optical fiber may be broken or a connector may not be set (including imperfect mounting), leakage of light can be merely recognized only after high-power light has leaked. As a result, the leaked light has adverse effects on the inside and outside of the exposure device.

In order to solve the aforementioned drawback, it suffices that an output value for inspection is simply decreased (for example, 100 mW or less). However, in this case, output characteristics vary with the passage of time or due to an ambient temperature. As a result, a driving current required for obtaining a predetermined light level or variation of output light quantity with respect to current variation (an inclination of current vs. light output characteristics) changes. Further, after an LD is exchanged due to a failure, there is also a difference in output characteristics between high-power LDs before and after the replacement.

For example, when each level used to obtain an output value for inspection is set in accordance with an LD having an approximately upright inclination (high angle inclination) in output characteristics thereof, there is a possibility that no output value for inspection is obtained from an LD having an approximately horizontal inclination (low angle inclination) in output characteristics thereof.

On the other hand, when each output value for inspection is set in accordance with an LD having an approximately horizontal inclination in output characteristics thereof, an output for inspection from an LD having an approximately upright inclination becomes large. If leakage of light may occur in the case of the LD having an approximately upright inclination, this leakage of light is large enough for adversely affecting the device.

SUMMARY OF THE INVENTION

In view of the aforementioned circumstances, it is an object of the present invention to provide a light leakage detecting device of an optical transmission system using fiber optic cables, in which an optimum inspection output is set for a high-power LD to be used, thereby making it possible to eliminate adverse effects on the inside and outside of an exposure device, which is caused by light leakage.

A first aspect of the present invention is a light leakage detecting device of an optical transmission system using a fiber optic cable, which is used in an optical transmission system, in which a fiber-coupled LD light source having at least a fiber coupling plug mounted at an output end thereof and outputting high-power light from an end of the fiber coupling plug, and a fiber optic cable connected via a connector to the fiber coupling plug and guiding the high-power light to a predetermined position are provided, and the high-power light is outputted from a light guiding end of the fiber optic cable, and used to detect light leakage in the optical transmission system, the device comprising: a light-quantity detector for detecting a quantity of light outputted from the light guiding end; an output control section which switches an output of the fiber-coupled LD light source between a normal level and a light-leakage detection level; a light-leakage detection level setting section for setting the light-leakage detection level based on output characteristics of the fiber-coupled LD light source; a light-leakage detection threshold storing section which stores therein a light-leakage detection threshold based on the output characteristics of the fiber-coupled LD light source; a comparing section for comparing a detected output value of the fiber-coupled LD light source controlled by the output control section at the light-leakage detection level, and the threshold stored in the light-leakage detection threshold storing section; and a determining section for determining, based on a comparison result of the comparing section, whether light leakage occurs or not.

In accordance with the first aspect, each light-leakage detection threshold is set and stored based on output characteristics of the respective fiber-coupled LD light sources to be used. Further, each light-leakage detection level is set based on output characteristics of the respective fiber-coupled LD light sources to be used.

The stored threshold and a detected output value of the fiber-coupled LD light source controlled by the output control section at the light-leakage detection level are compared with each other. Therefore, it is possible to constantly detect leakage of light at a proper light-leakage detection level, and a problem is solved in which leaked light becomes high-power light having adverse effects on the inside and outside of the device or the light-leakage detection level cannot arrive at a level necessary for detecting light leakage.

In accordance with a second aspect of the present invention, in the device of the aforementioned first aspect, the fiber optic cable is applied to a printing-plate exposure device in which a printing plate is scan-exposed by rotating a rotating drum on which the printing plate is wound and moving a recording head disposed to face a peripheral surface of the rotating drum in an axial direction of the rotating drum, and is used to connect a light source unit in which the fiber-coupled LD light source is fixed and disposed, and the recording head moving in the axial direction of the rotating drum.

In accordance with the second aspect, the aforementioned printing plate exposure device has a tendency to increase a rotational speed of the rotating drum and a traveling speed of the recording head, and also increase a scanning speed to allow high-speed processing. Therefore, the fiber-coupled LD also has a tendency to emit high-power light. Accordingly, safety in the device can be maintained by providing detection of light leakage by using lower-power light.

In accordance with a third aspect of the present invention, there is provided a light leakage detecting device of an optical transmission system using a fiber optic cable, which is used in an optical transmission system, in which a light source outputting light and a fiber optic cable connected to the light source and guiding the light to a predetermined position are provided, and the light is outputted from a light guiding end of the fiber optic cable, and for detecting light leakage in the optical transmission system, said device comprising: a light-quantity detector for detecting a quantity of light outputted from the light guiding end; a control section which controls an output of the light source; a setting section for setting a light-leakage detection level which is lower than a normal level, based on output characteristics of the light source; a comparing section for comparing a detected value of quantity of light from the light source controlled so as to be the light-leakage detection level by the control section, which is detected by the light-quantity detector, and a threshold value on the basis of the light-leakage detection level; and a determining section for determining, based on a comparison result of the comparing section, whether light leakage occurs or not.

In accordance with a fourth aspect of the present invention, in the device of the aforementioned third aspect, the light-leakage detection level is obtained on the basis of emitting light of the light source with at least two levels.

In accordance with a fifth aspect of the present invention, in the device of the aforementioned third aspect, the devise further comprises a display section for displaying the comparison result of the comparing section, and in a case in which the detected value is equal to or more than the threshold value, the display section displays that the optical transmission system is in a normal state, and in a case in which the detected value is less than the threshold value, the display section displays that the optical transmission system is in an abnormal state.

BRIEF DESCRIPTION OF THE DRAWINGS

FIG. 3 is a front view showing a driving system of the sub-unit.

FIG. 4 is a plan view showing an interior of a light source unit.

FIG. 5A is a block diagram for control of light emitted from a high-power LD; and FIGS. 5B to 5E are output characteristic diagrams of various sections shown in FIG. 5A.

DESCRIPTION OF THE PREFERRED EMBODIMENTS

Figure 1:
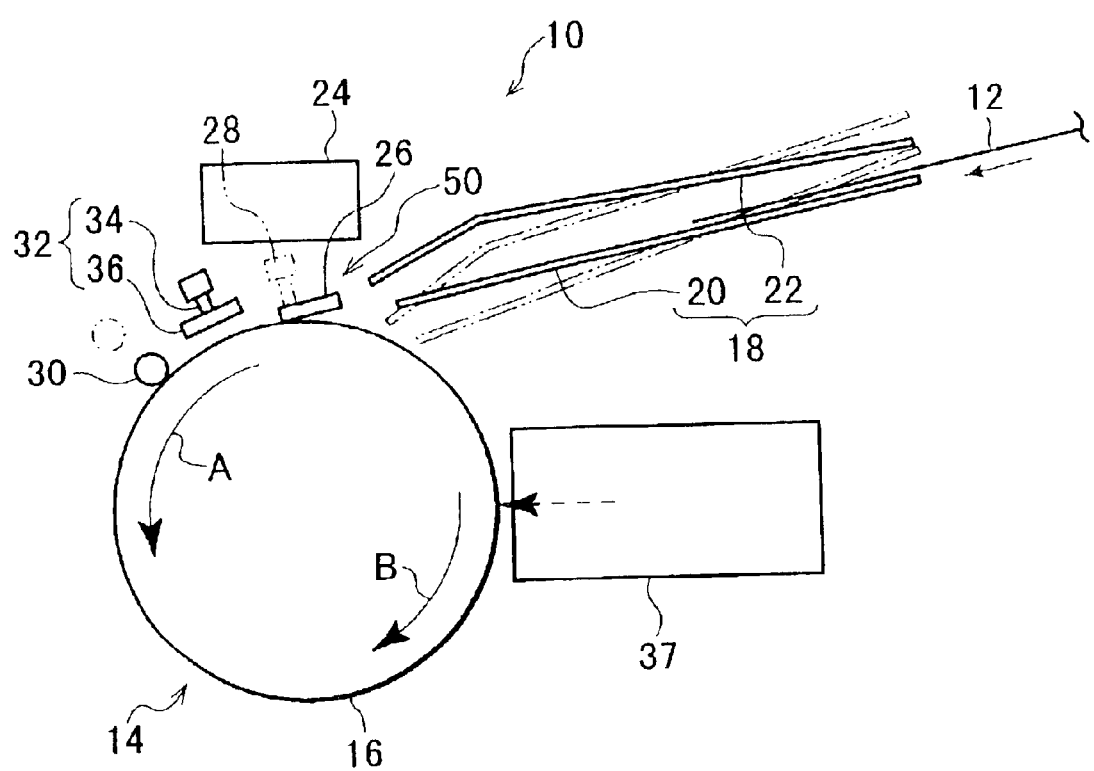
FIG. 1 is a schematic diagram of an automatic printing plate exposure device according to an embodiment of the present invention.

FIG. 1 shows an automatic printing plate exposure device 10 according to an embodiment of the present invention.

The automatic printing plate exposure device 10 is divided into two blocks: an exposure section 14 in which an image is formed with an image forming layer of a printing plate 12 being irradiated with a light beam; and a transport guide unit 18 in which the printing plate 12 is conveyed to the exposure section 14. Further, the exposed printing plate 12 is conveyed by the automatic printing plate exposure device 10 to a developing device (not shown) disposed adjacent to the automatic printing plate exposure device 10.

The exposure section 14 includes, as a principal portion thereof, a rotating drum 16 which holds the printing plate 12 wound on a peripheral surface thereof. The printing plate 12 is guided to the transport guide unit 18 and conveyed to the rotating drum 16 from a tangential direction thereof. The transport guide unit 18 is formed by a plate feeding guide 20 and a plate discharging guide 22.

The relative positional relationship between the plate feeding guide 20 and plate discharging guide 22 of the transport guide unit 18 is set so as to have a substantially V-shaped configuration when seen from the side, and these guides are structured so as to rotate by a predetermined angle around substantially central portions thereof in FIG. 1. Due to the rotation, the plate feeding guide 20 or plate discharging guide 22 can be selectively made to correspond to the rotating drum 16 (can be disposed along the tangential direction of the rotating drum 16).

A puncher 24 is disposed in the vicinity of the transport guide unit 18. Due to the plate feeding guide 20 being made to face the puncher 24, a leading end of the printing plate 12 can be conveyed into the puncher 24. That is, the printing plate 12 is first guided by the plate feeding guide 20 and conveyed into the puncher 24, and a positioning notch is formed at the leading end of the printing plate 12, and thereafter, the printing plate 12 is temporarily returned to the plate feeding guide 20. Subsequently, the transport guide unit 18 is rotated and the printing plate 12 is moved to a position corresponding to the rotating drum 16.

The rotating drum 16 is rotated by driving means (not shown) in a direction in which the printing plate 12 is mounted and exposed (the direction indicated by arrow A in FIG. 1) and in a direction opposite thereto, in which the printing plate 12 is removed (the direction indicated by arrow B in FIG. 1).

As shown in FIG. 1, a leading-end clamp mechanism 50 is attached to the rotating drum 16 provided in the exposure section 14 at a predetermined position on an outer peripheral surface of the rotating drum 16. When the printing plate 12 is mounted to the rotating drum 16 in the exposure section 14, first, a leading-end chuck 26 stops the rotating drum 16 at a position corresponding to (facing) the leading end of the printing plate 12 conveyed by the plate feeding guide 20 of the transport guide unit 18 (that is, a position at which the printing plate is mounted).

Due to a lifting block 28 being moved downward to press one end of the leading-end chuck 26, the printing plate 12 can be inserted into between the leading-end chuck 26 and the peripheral surface of the rotating drum 16.

At this time, a position of the printing plate 12 with respect to the rotating drum 16 is set and the printing plate 12 is positioned on the rotating drum 16 by the printing plate 12 abutting against a positioning pin (not shown) protruding from a predetermined position on the peripheral surface of the rotating drum 16.

At the point in time at which the printing plate 12 is positioned, the leading end of the printing plate 12 is nipped by and held between the leading-end chuck 26 and the peripheral surface of the rotating drum 16 by moving upward the lifting block 28.

As shown in FIG. 1, when the leading end of the printing plate 12 is fixed to the rotating drum 16 in the exposure section 14, the rotating drum 16 is rotated in the direction in which the printing paper is mounted and exposed. As a result, the printing plate 12 fed from the plate feeding guide 20 of the transport guide unit 18 is wound on the peripheral surface of the rotating drum 16.

A squeeze roller 30 is disposed in the vicinity of the peripheral surface of the rotating drum 16 further at a downstream side in the direction in which the printing plate is mounted and exposed than the position at which the printing plate is mounted. The squeeze roller 30 moves toward the rotating drum 16 to press the printing plate 12 to be wound on the rotating drum 16, against the rotating drum 16, and irons and draws the printing plate 12. As a result, the printing plate 12 is closely adhered to the peripheral surface of the rotating drum 16.

Further, in the exposure section 14, a trailing-end chuck removable unit 32 is disposed in the vicinity of the rotating drum 16 further at an upstream side in the direction in which the printing plate is mounted and exposed than the squeeze roller 30. The trailing-end chuck removable unit 32 is provided with a trailing-end chuck 36 mounted at an end of a shaft 34 which protrudes toward the rotating drum 16.

In the exposure section 14, when a trailing end of the printing plate 12 wound on the rotating drum 16 faces the trailing-end chuck removable unit 32, the shaft 34 is made to protrude to allow the trailing-end chuck 36 to be mounted at a predetermined position on the rotating drum 16. As a result, the trailing-end chuck 36 nips and holds, together with the rotating drum 16, the trailing end of the printing plate 12.

In the exposure section 14, when the leading end and trailing end of the printing plate 12 are held by the rotating drum 16, the squeeze roller 30 is moved apart from the printing plate 12. Thereafter, the rotating drum 16 is rotated at a predetermined high rotational speed, and at the same time, a light beam modulated based on image data is emitted from a recording head portion 37 synchronously with the rotation of the rotating drum 16. As a result, the printing plate 12 is scan-exposed based on image data.

When scan-exposure for the printing plate 12 is completed in the exposure section 14, the trailing-end chuck 36 holding the trailing end of the printing plate 12 temporarily stops the rotating drum 16 at a position facing the trailing-end chuck removable unit 32 to separate the trailing-end chuck 36 from the rotating drum 16. As a result, the trailing end of the printing plate 12 is released.

Subsequently, due to the rotating drum 16 being rotated in the direction in which the printing plate 12 is discharged, the printing plate 12 is discharged into the plate discharging guide 22 of the transport guide unit 18 from the side of the trailing end thereof along the tangential direction of the rotating drum 16. Thereafter, the printing plate 12 is conveyed to a developing device in a subsequent process.

Figure 2:
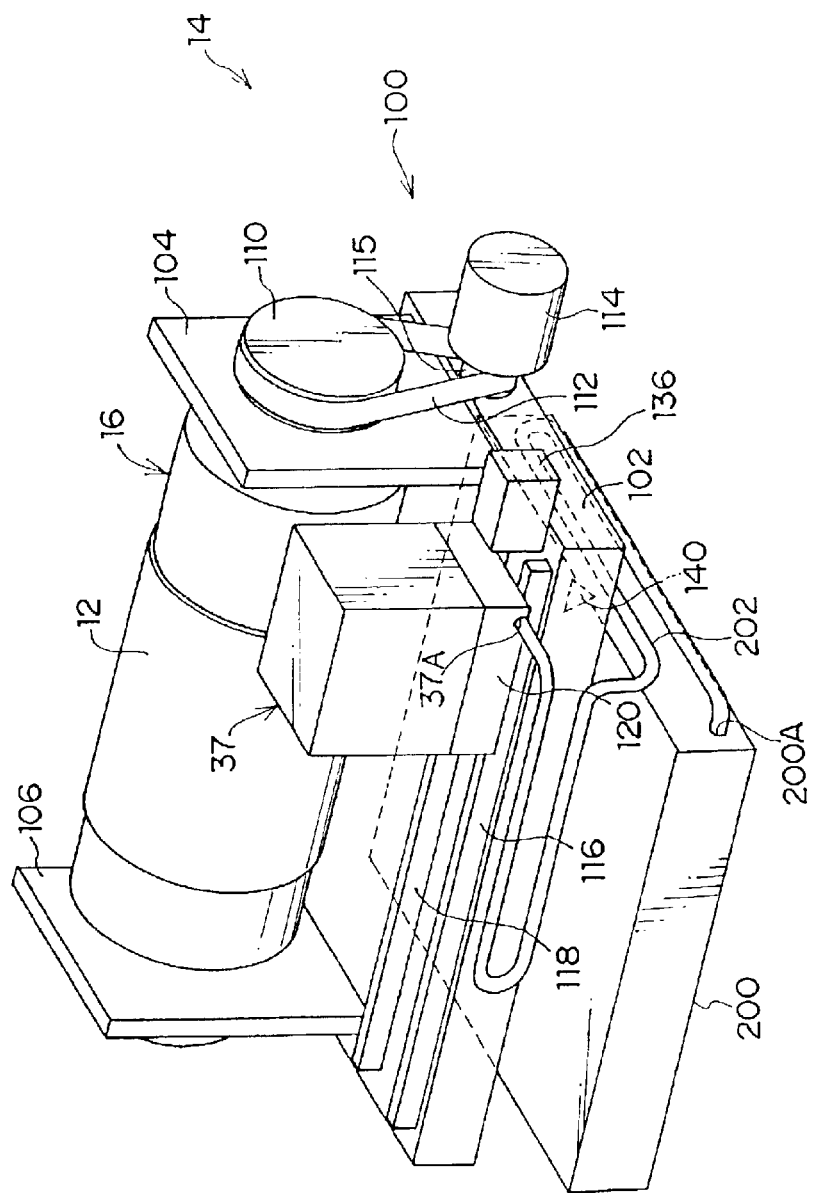
FIG. 2 is a perspective view of a sub-unit including a rotating drum and a recording head.

FIG. 2 shows a sub-unit 100, having the rotating drum 16 and the recording head 37 assembled thereto, in the exposure section 14.

In the sub-unit 100, a pair of side plates 104 and 106 are disposed parallel to each other and mounted on a base 102 which entirely supports the sub-unit 100, and a rotating shaft of the rotating drum 16 is supported by the side plates 104 and 106.

A pulley 110 is mounted at a rotating shaft 108 (see FIG. 3) protruding from the side plate 104. A belt 112 is wound on an outer periphery of the pulley 110.

A drive motor 114 is mounted to the base 102. The aforementioned belt 112 is also wound on a pulley 115 mounted at a rotating shaft of the drive motor 114. As a result, the rotating drum 16 is rotated by driving force of the drive motor 114.

The base 102 is provided with a pair of rails 116 and 118 which are disposed parallel to each other to extend from the side plate 104 to the another side plate 106. A supporting base 120 which supports the recording head 37 is placed on the rails 116 and 118. The supporting base 120 is made movable along the rails 116 and 118 in the axial direction of the rotating drum 16.

Further, as shown in FIG. 3, a slit hole 122 passing through the base 102 from the front to back surfaces thereof is provided between the rails 116 and 118, and the supporting base 120 is connected via a connecting member 124 to a ball screw mechanism portion 126 mounted at the side of the back surface of the base 102.

As shown in FIG. 3, a through hole 128A is formed in the connecting member 124 and a shaft 128 which forms the ball screw mechanism portion 126 coaxially passes through the through hole 128A. A male screw 130 is formed on the outer periphery of the shaft 128 and both ends thereof are supported at positions of the side plates 104 and 106, which positions face each other.

A moving block 132 is screwed on the male screw 130 of the shaft 128. The moving block 132 is mounted to the connecting member 124 via a tubular member 134. As a result, the moving block 132 is prevented form rotating, and movement of the moving block 132 itself (movement of the moving block 132 in the axial direction of the shaft 128) can be transmitted to the connecting member 124.

One end of the shaft 128 is connected to a rotating shaft of a drive motor 136 and the shaft 128 can be rotated by driving force of the drive motor 136. Due to rotation of the shaft 128, the moving block 132 moves in the axial direction of the shaft 128, and based thereon, the recording head 37 can be moved along the axial direction of the rotating drum 16.

Further, an original-position detecting sensor 138 is mounted at the connecting member 124. The original-position detecting sensor 138 is provided so as to detect an original position mark 140 provided in the base 102. The original position mark 140 is provided at a starting point of movement of the recording head 37 at the side of one axial-direction end of the rotating drum 16.

As shown in FIG. 2, a light source unit 200 is disposed so as to correspond to the recording head 37 of the sub-unit 100. Although the recording head 37 is movable along the axial direction of the shaft 128, the light source unit 200 is basically disposed fixedly at a lower position in the sub-unit 100.

Fiber optic cables (a fiber optic cable bunch) 202 forming an optical transmission system are provided so as to connect the light source unit 200 and the recording head 37 with both ends thereof being located at the light source unit 200 and the recording head 37, respectively.

The fiber optic cables 202 have flexibility and extend from an output portion 200A provided on a side surface of the light source unit 200 and disposed at the lower side of the base 102 of the sub-unit 100. The fiber optic cables 202 are disposed so as to form a substantially U-shaped configuration at the lower side of the base 102 by being bent to form upper and lower portions thereof. An intermediate portion of the fiber optic cables 202 which is at the recording head 37 side with respect to a portion of the fiber optic cables 202 disposed at the lower side of the base 102 is mounted (fixed) at a side surface of the base 102.

Although the light source unit 200 is basically disposed fixedly at the side of the lower surface of the base 102, the light source unit 200 can be, at the time of maintenance, guided by a rail (not shown) and pulled out from the lower surface of the base 102. When the light source unit 200 is pulled out, a substantially U-shaped bent portion of the fiber optic cables 202, that is, a U-turn portion of the fiber optic cables 202 moves due to deflection of the fiber optic cables 202, thereby allowing relative displacement of the light source unit 200 and the base 102.

Further, the fiber optic cables 202 whose intermediate portion is mounted (fixed) to the base 102 are disposed so as to form a substantially U-shaped configuration along a direction in which the recording head 37 moves, by being bent to form upper and lower portions thereof. An end of the fiber optic cables 202 at the side of the recording head portion 37 is inputted from an input portion 37A of the recording head 37 into the recording head portion 37.

At the time of scan-exposure of the recording head 37, the U-turn portion moves due to deflection of the fiber optic cables 202 on the base 102, thereby allowing relative displacement of the base 102 and the recording head 37.

As shown in FIG. 4, a plurality of high-power LD 204, which are light sources of a plurality of light beams simultaneously emitted from the recording head 37, are arranged within the light source unit 200. In the present embodiment, 96 high-power LD 204 are arranged oppositely in two rows.

Each high-power LD 204 is connected to a control unit 206 at one side thereof and also connected to a fiber coupling plug 208 at the other side. The fiber coupling plug 208 is connected via a connector 210 to an end of the fiber optic cable 202A. The fiber optic cable 202A is a single-body cable, and a bundle of fiber optic cables (the fiber optic cables 202) provides a connection between the recording head 37 and the light source unit 200.

FIG. 5A shows a control block diagram explaining controlling sections provided in the control unit 206 and used to operate (emit light from) the high-power LD 204.

Digital data corresponding to image information is outputted from a CPU 212 and converted by a D/A converter 214 to analog data (a voltage value). The converted analog data is amplified by an amplifier 216, and thereafter, converted by a V-I converter 218 to a current value and transmitted to the high-power LD 204. An output of the high-power LD 204 is controlled in accordance with the current value based on digital data (see FIG. 5B) and light is emitted therefrom.

The emitted light is led to the recording head 37 via the fiber optic cables 202 and applied to the printing plate 12 wound on the peripheral surface of the rotating drum 16 via a light condensing optical system 220.

A photo-detector 222 is provided on (or inside) a portion of the surface of the rotating drum 16 at a side of one end in the axial direction (which portion faces a home position of the recording head 37). The photo-detector 222 detects light outputted from the recording head 37 located at the home position, and performs adjustment of light quantity based on the detected value. The adjustment of light quantity means adjustment of an exposed state (density) on the printing plate 12 based on digital data, and a difference in output characteristics between the high-power LDs are corrected. As a result, the printing plate 12 can be exposed with a desired density.

Further, in the present embodiment, a determination for light leakage is carried out based on the detected value in the photo-detector 222. That is, the fiber optic cables 202 deflect (deform) due to movement of the recording head 37 or deflect when the light source unit 200 is pulled out from the lower side of the sub-unit 100 at the time of maintenance. Therefore, there is a possibility that the fiber optic cables 202 may be deteriorated with the passage of time, or may be broken or heavily bent by interfering with other components. Further, in a case in which the high-power LD 204 is exchanged because of deterioration thereof with the passage of time or damage caused therein, the high-power LD 24 is detached from and a new one is attached to the connector 210. As a result, attaching deficiency of the connector 210 after replacement may be caused.

When light leaks from the high-power LD 204, it has a strong power and has adverse affects on the inside and outside of the device. Therefore, it is important to previously determine leakage of light and deal therewith from the standpoint of safety.

Figure 6:
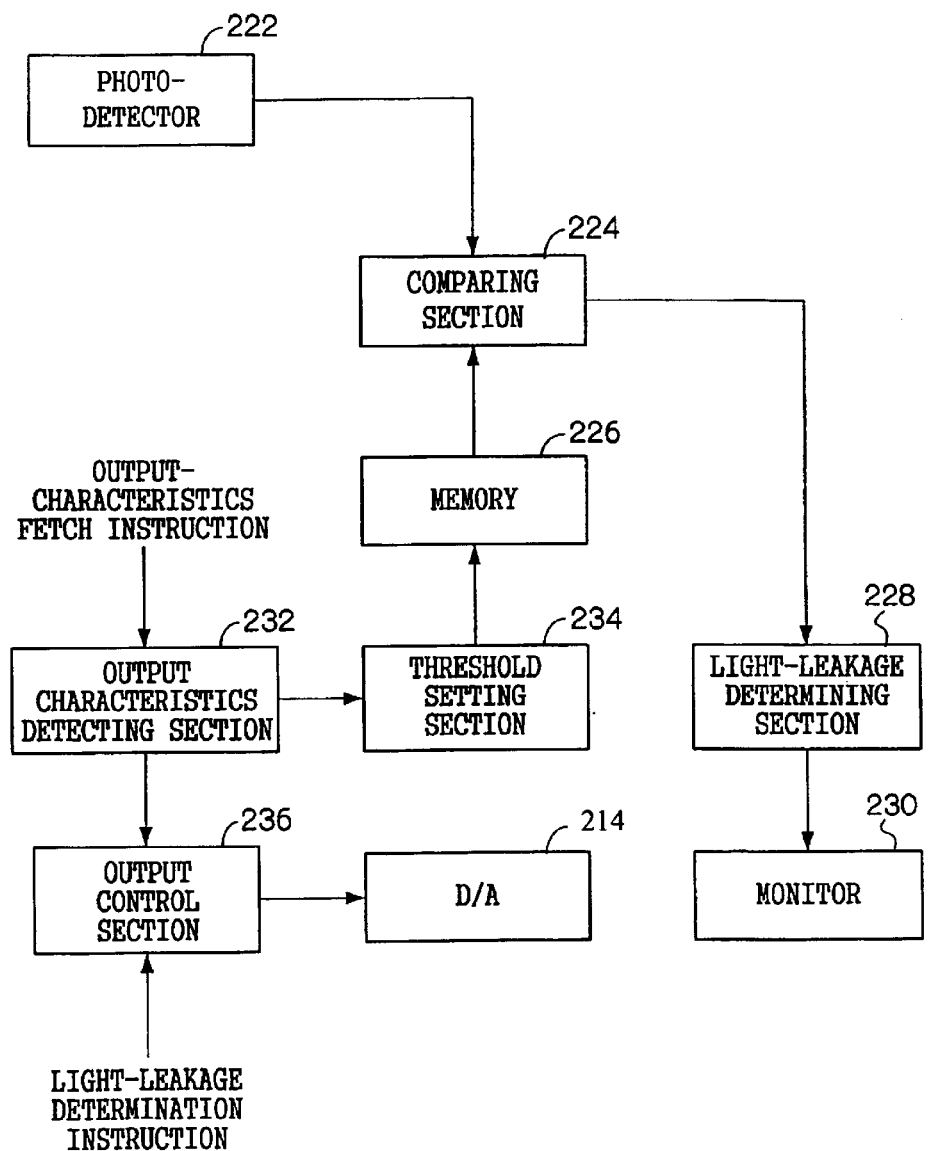
FIG. 6 is a functional block diagram for detection of light leakage.

FIG. 6 shows a functional block diagram used for detection of light leakage.

A detection signal from the photo-detector 222 is inputted to a comparing section 224 and a threshold stored in memory 226 is fetched therein. The detection signal and the threshold are compared with each other in the comparing section 224. The comparison result is transmitted to a light leakage determining section 228 and it is determined by the light leakage determining section 228 as to whether light leakage may occur or not.

The result of determination made by the light leakage determining section 228 is transmitted to a monitor 230 mounted to the device and the determination as to whether light leakage occurs or not is notified.

The threshold stored in the memory 226 is set for each corresponding high-power LD 204. That is, as shown in FIGS. 5C and 5D, light outputs of the same high-power LD 204 with respect to digital data (a current value) from the CPU 212 have different threshold current values and inclinations due to a change in ambient temperature or change with the passage of time. Further, as shown in FIG. 5E, for example, when the high-power LD 204 breaks down and is replaced by another high-power LD, the high-power LD 204 before replacement (indicated by the chain line in FIG. 5E) and the high-power LD 204 after replacement (indicated by the solid line in FIG. 5E) show different inclinations.

As shown in FIG. 6, when an output-characteristics fetch instruction signal is inputted to an output-characteristics detecting section 232 at a proper time, output characteristics for a high-power LD 204 used at that time is recognized in the output-characteristics detecting section 232. The recognized output characteristics is transmitted to a threshold setting section 234 and also to an output control section 236. An optimum threshold is set in the threshold setting section 234. When a signal of indicating a determination as to light leakage is inputted to the output control section 236, the output control section 236 controls so as to output digital data for a level for detection of light leakage (100 mW or less) to the D/A converter 214 (see FIG. 5A).

Next, the operation of the present embodiment will be described.

The printing plate 12 is conveyed to the plate feeding guide 20 of the transport guide unit 18, and thereafter, in a case in which punching is required for the printing plate 12, the transport guide unit 18 is switched to the side of the puncher 24 to allow the plate feeding guide 20 to correspond to the puncher 24.

In the puncher 24, predetermined punching is carried out for a leading end of the printing plate 12, and thereafter, the printing plate 12 is returned to the plate feeding guide 20 and temporarily positioned thereat.

Further, in the case of exposure processing, the transport guide unit 18 is switched to the side of the rotating drum 16 to allow the plate feeding guide 20 to correspond to the rotating drum 16. As a result, the printing plate 12 can be conveyed to the rotating drum 16 from the tangential direction of the rotating drum 16.

The printing plate 12 conveyed to the rotating drum 16 is closely wound on the peripheral surface of the rotating drum 16 by the leading-end chuck 26 and the trailing-end chuck 36, and positioning of the printing plate 12 for exposure is completed.

In a state in which the rotating drum 16 is on standby at a predetermined position in which it receives and holds the printing plate 12, the leading-end chuck 26 faces the lifting block 28.

At this time, the lifting block 28 is located at the lowermost position, and in this state, the printing plate 12 can be inserted in a space between the leading-end chuck 26 and the rotating drum 16.

When the printing plate 12 is inserted in the space and positioned at a predetermined position, the lifting block 28 moves upward (in a direction away from the rotating drum 16) and the leading end of the printing plate 12 is held by the leading-end chuck 26. Due to rotation of the rotating drum 16, the printing plate 12 is sequentially wound on the rotating drum 16. At the time of the winding, the squeeze roller 30 is brought into contact with the rotating drum 16 and the printing plate 12 is wound on the rotating drum 16 while being ironed by the squeeze roller 30. Therefore, the printing plate 12 can be wound without producing blister or looseness between the printing plate 12 and the rotating drum 16.

When winding of the printing plate 12 is completed, mounting of the printing plate 12 to the rotating drum 16 is completed with the trailing end of the printing plate 12 being held by the trailing end chuck 36.

When mounting of the printing plate 12 to the rotating drum 16 is completed, image data is read and exposure processing is started by a light beam from the recording head 37. The exposure processing mentioned herein is so-called scan-exposure in which the recording head 37 is moved in the axial direction of the rotating drum 16 while the rotating drum 16 is being rotated at a high speed (main scanning).

When exposure processing is completed, the transport guide unit 18 is switched (the plate discharging guide 22 is made to correspond to the rotating drum 16). Subsequently, the printing plate 12 wound on the rotating drum 16 is discharged from the tangential direction of the rotating drum 16. At this time, the printing plate 12 is conveyed to the plate discharging guide 22.

When the printing plate 12 is conveyed to the plate discharging guide 22, the transport guide unit 18 is switched and the plate discharging guide 22 is made to correspond to a discharging opening to discharge the printing plate 12. A developing section is provided in a direction in which the printing plate is discharged, and the printing plate 12 is continuously subjected to development processing.

Since the high-power LD 204 is used in the present embodiment, it is necessary to pay close attention to leakage of light. Therefore, a determination for light leakage is carried out at an appropriate time. Further, in the present embodiment, light leakage is not determined in a high-power state (by using high-power light). Even if light leakage may occur, light leakage at an output value (100 mW or less) which does not have a great effect on the inside and outside of the device is allowed. That is, in the conventional art, a determination for light leakage in a low-power state (by using low-power light) cannot be carried out because there is a variation in output characteristics of a high-power LD depending on conditions or a difference in output characteristics of high-power LDs (a difference in threshold current or inclination). Accordingly, in the present embodiment, an optimum light-leakage detection level for each high output LD 204 to be used is previously recognized and a determination for light leakage in a low-power state is thereby realized.

Figure 7:
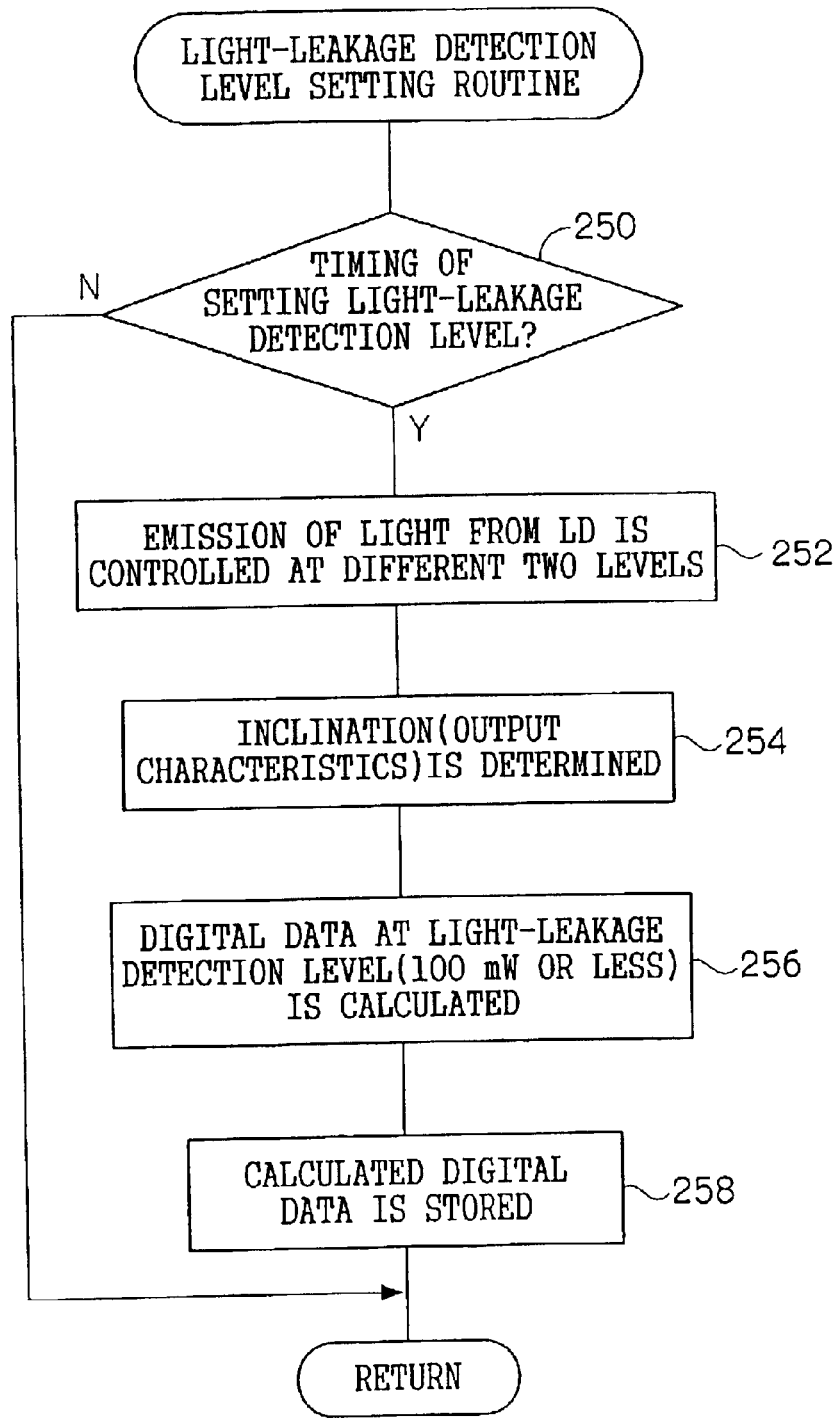
FIG. 7 is a control flowchart showing a routine for setting a light leakage detection level.
Figure 8:
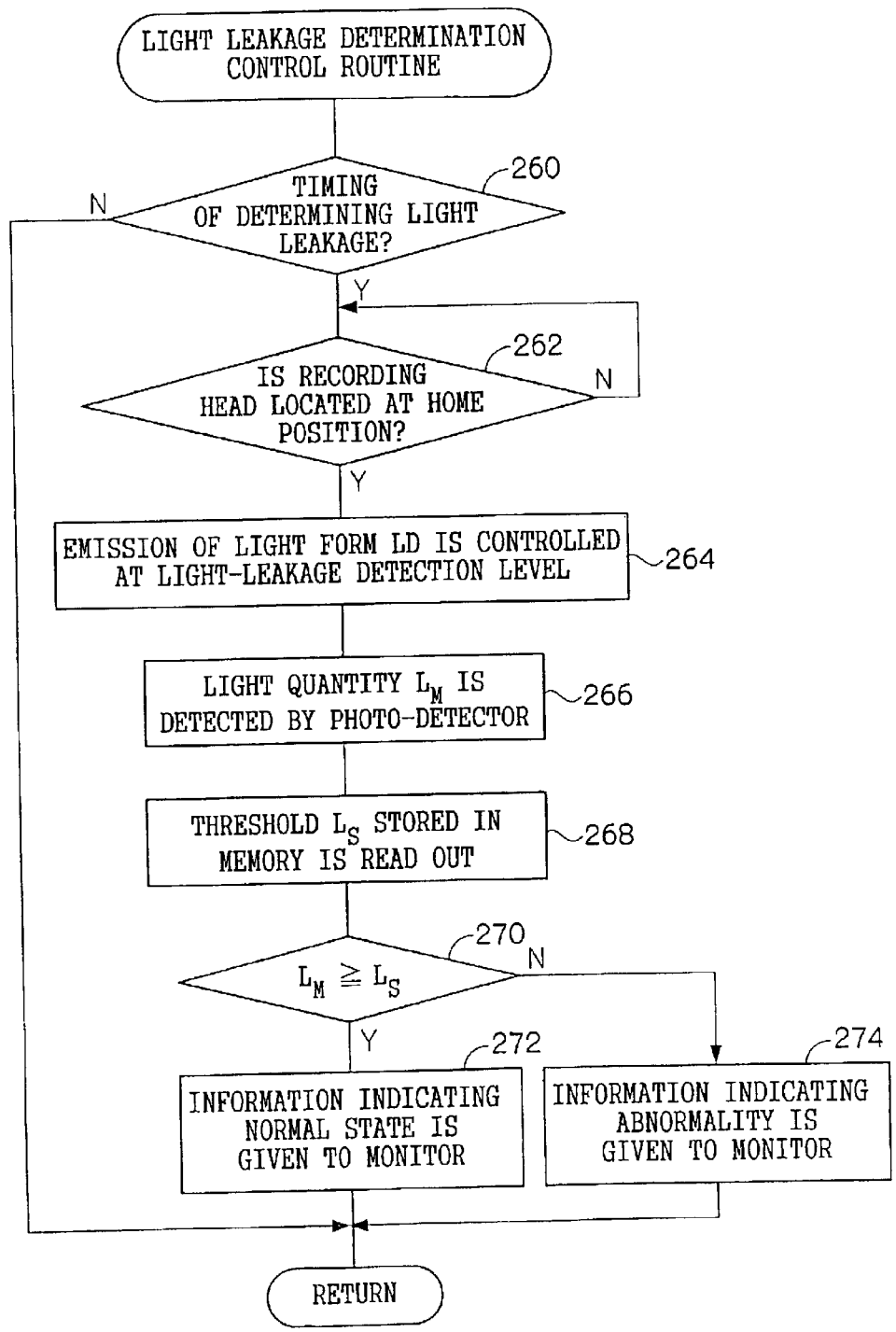
FIG. 8 is a control flowchart of an exposure determination routine.

Next, with reference to the flow charts shown in FIGS. 7 and 8, a procedure for setting a light-leakage detection level and a procedure for determination of light leakage will be described.

First, with reference to the flowchart shown in FIG. 7, a routine for setting a light leakage detection level will be described.

In step 250, it is determined whether the timing of setting a light-leakage detection level has come or not. A light-leakage detection level needs to be varied and reset each time the high-power LD 204 is exchanged.

When the decision of step 250 is made affirmative, the process proceeds to step 252 in which emission of light is carried out at different two levels in the high-power LD 204. In the subsequent step 254, an inclination (output characteristics) is determined based on quantities of light emitted at the aforementioned two levels.

In step 256, digital data which allows emission of light at a light-leakage detection level (100 mV or less) is calculated based on the determined inclination. In the subsequent step 258, the digital data is stored and the routine ends.

Next, a description will be given of a light-leakage determination routine with reference to the flowchart shown in FIG. 8.

In step 260, it is determined whether the timing at which light leakage is determined has come. This step may be performed before each exposure of an image is started, or may be performed periodically (at predetermined spans) or irregularly.

When the decision of step 260 is made affirmative, the process proceeds to step 262 in which it is determined whether the recording head 37 is located at a home position. When the decision of step 262 is made affirmative, the process proceeds to step 264 in which the high-power LD 204 is made to emit light at the light-leakage detection level set in the flowchart shown in FIG. 7.

In step 266, the quantity of light in the state of being emitted as described above is detected by the photo-detector 222 ($L_M$).

In step 268, a threshold $L_S$ stored in the memory 226 is read. In the subsequent step 270, the aforementioned detected value $L_M$ and the threshold $L_S$ are compared with each other.

When $L_M \geq L_S$ in step 270 (an affirmative decision), the process proceeds to step 272 in which information indicating a normal state is given to the monitor 230. When $L_M < L_S$ (a negative decision), the process proceeds to step 274 in which information indicating abnormality is given to the monitor 230, and the routine ends.

According to the aforementioned embodiment, a light-leakage detection level is set correspondingly to output characteristics of each high-power LD 204 and respective thresholds are previously stored. Therefore, leakage of light can be determined in a low-power state (100 mW or less). Accordingly, even if light leakage occurs, leakage of light can be determined before high-power light leaks, thereby making it possible to avoid adverse effects on the inside and outside of the device.

As described above, the present invention has an excellent effect in that it is possible to eliminate adverse effects on the inside and outside of the device, caused by light leakage, by setting an optimum inspection output for a high-power LD to be used.

What is claimed is:

1. A light leakage detecting device of an optical transmission system using a fiber optic cable, which is used in an optical transmission system, in which a fiber-coupled LD light source having at least a fiber coupling plug mounted at an output end thereof and outputting high-power light from an end of the fiber coupling plug, and a fiber optic cable connected via a connector to the fiber coupling plug and guiding the high-power light to a predetermined position are provided, and the high-power light is outputted from a light guiding end of the fiber optic cable, and for detecting light leakage in the optical transmission system, said device comprising:

a light-quantity detector for detecting a quantity of light outputted from the light guiding end;

an output control section which switches an output of the fiber-coupled LD light source between a normal level corresponding to an operating state of the optical transmission system and a light-leakage detection level corresoonding to a light-leakage testing state of the optical transmission system, which is lower than the normal level;

a light-leakage detection level setting section for setting the light-leakage detection level based on output characteristics of the fiber-coupled LD light source;

a light-leakage detection threshold storing and setting section which sets and stores therein a light-leakage detection threshold based on the output characteristics of the fiber-coupled LD light source;

a comparing section for comparing a detected output value of the fiber-coupled LD light source controlled by the output control section at the light-leakage detection level, and the threshold stored in the light-leakage detection threshold storing section; and a determining section for determining, based on a comparison result of the comparing section, whether light leakage occurs or not.

2. The device of claim 1, wherein the fiber optic cable is applied to a printing-plate exposure device in which a printing plate is scan-exposed by rotating a rotating drum on which the printing plate is wound and moving a recording head disposed to face a peripheral surface of the rotating drum in an axial direction of the rotating drum, and is used to connect a light source unit in which the fiber-coupled LD light source is fixed and disposed, and the recording head moving in the axial direction of the rotating drum.

3. A light leakage detecting device of an optical transmission system using a fiber optic cable, which is used in an optical transmission system, in which a light source outputting light and a fiber optic cable connected to the light source and guiding the light to a predetermined position are provided, and the light is outputted from a light guiding end of the fiber optic cable, and for detecting light leakage in the optical transmission system, said device comprising:

a light-quantity detector for detecting a quantity of light outputted from the light guiding end;

a control section which controls an output of the light source;

a setting section for setting a light-leakage detection level corresponding to a light-leakage testing state of the optical transmission system, which is lower than a normal level corresponding to an operating state of the optical transmission system, based on output characteristics of the light source;

a comparing section for comparing a detected value of quantity of light from the light source controlled so as to be the light-leakage detection level by the control section, which is detected by the light-quantity detector, and a threshold value on the basis of the light-leakage detection level; and a determining section for determining, based on a comparison result of the comparing section, whether light leakage occurs or not.

4. The device of claim 3, wherein the light-leakage detection level is obtained on the basis of emitting light of the light source with at least two levels.

5. The device of claim 3 further comprising a display section for displaying the comparison result of the comparing section, wherein, in a case in which the detected value is equal to or more than the threshold value, the display section displays that the optical transmission system is in a normal state, and in a case in which the detected value is less than the threshold value, the display section displays that the optical transmission system is in an abnormal state.

6. The light leakage detecting device of claim 1, wherein the normal level and the light-leakage detection level represent respective output levels of the fiber-coupled LD light source that are greater than zero.

7. The light leakage detecting device of claim 3, wherein the normal level and the light-leakage detection level represent respective output levels of the light source that are greater than zero.

8. The light leakage detecting device of claim 3, wherein the threshold value is based on output characteristics of the light source.

9. The light leakage detecting device of claim 1, wherein the light-leakage detection level corresponds to a fiber-coupled LD light source output that is less than or equal to 100 mW.

10. The light leakage detecting device of claim 3, wherein the light-leakage detection level corresponds to a light source output that is less than or equal to 100 mW.

* * * * *